United States Patent [19]

Beziers et al.

[11] Patent Number: 5,403,907
[45] Date of Patent: Apr. 4, 1995

[54] PREPOLYMERS HAVING IMIDE GROUPS

[75] Inventors: Daniel Beziers, St Medard en Jalles; Yves Camberlin, Caluire; Evelyne Chataignier, St Medard en Jalles; Patrice Dourthe, Rion des Landes, all of France

[73] Assignee: Ciba-Geigy Corporation, Ardsley, N.Y.

[21] Appl. No.: 104,048

[22] PCT Filed: Feb. 14, 1992

[86] PCT No.: PCT/FR92/00149
§ 371 Date: Aug. 11, 1993
§ 102(e) Date: Aug. 11, 1993

[87] PCT Pub. No.: WO92/14767
PCT Pub. Date: Sep. 3, 1992

[30] Foreign Application Priority Data

Feb. 15, 1991 [FR] France .................. 91 01834

[51] Int. Cl.$^6$ ............... C08F 222/40; C08F 226/06; C08F 220/10; C08F 224/00; C08F 220/10; C08F 212/08
[52] U.S. Cl. ................ 526/262; 526/264; 526/265; 526/270; 526/328.5; 526/347
[58] Field of Search ........... 526/262, 264, 265, 270, 526/328.5, 347

[56] References Cited

U.S. PATENT DOCUMENTS

| | | | |
|---|---|---|---|
| 3,018,290 | 1/1962 | Sauers et al. | 260/326.3 |
| 3,535,403 | 10/1970 | Holub et al. | 260/837 |
| 4,526,925 | 7/1985 | Parker et al. | 524/548 |
| 4,568,733 | 2/1986 | Parker et al. | 526/262 |
| 4,766,179 | 8/1988 | De Koning | 525/282 |
| 4,994,536 | 2/1991 | Arpin | 526/262 |
| 5,075,398 | 12/1991 | de Koning et al. | 526/262 |

FOREIGN PATENT DOCUMENTS 0206383 12/1986 European Pat. Off. .
2427346 12/1979 France .

OTHER PUBLICATIONS

Chemical Abstract 92: 182069j.

*Primary Examiner*—Joseph L. Schofer
*Assistant Examiner*—Wu C. Cheng
*Attorney, Agent, or Firm*—William A. Teoli

[57] ABSTRACT

Prepolymers having imide groupings and process for their preparation, for use in the production of resins capable of hardening under ionizing radiation. The prepolymers are derived from the reaction in a homogeneous liquid medium, at a temperature of between 50° and 250° C. of, firstly, imide grouping-generating reagents consisting of a least two specific maleimides of different kinds, and, secondly, two additional reagents, composed of a specific acrylate reagent and a specific vinyl compound other that an acrylate.

9 Claims, 1 Drawing Sheet

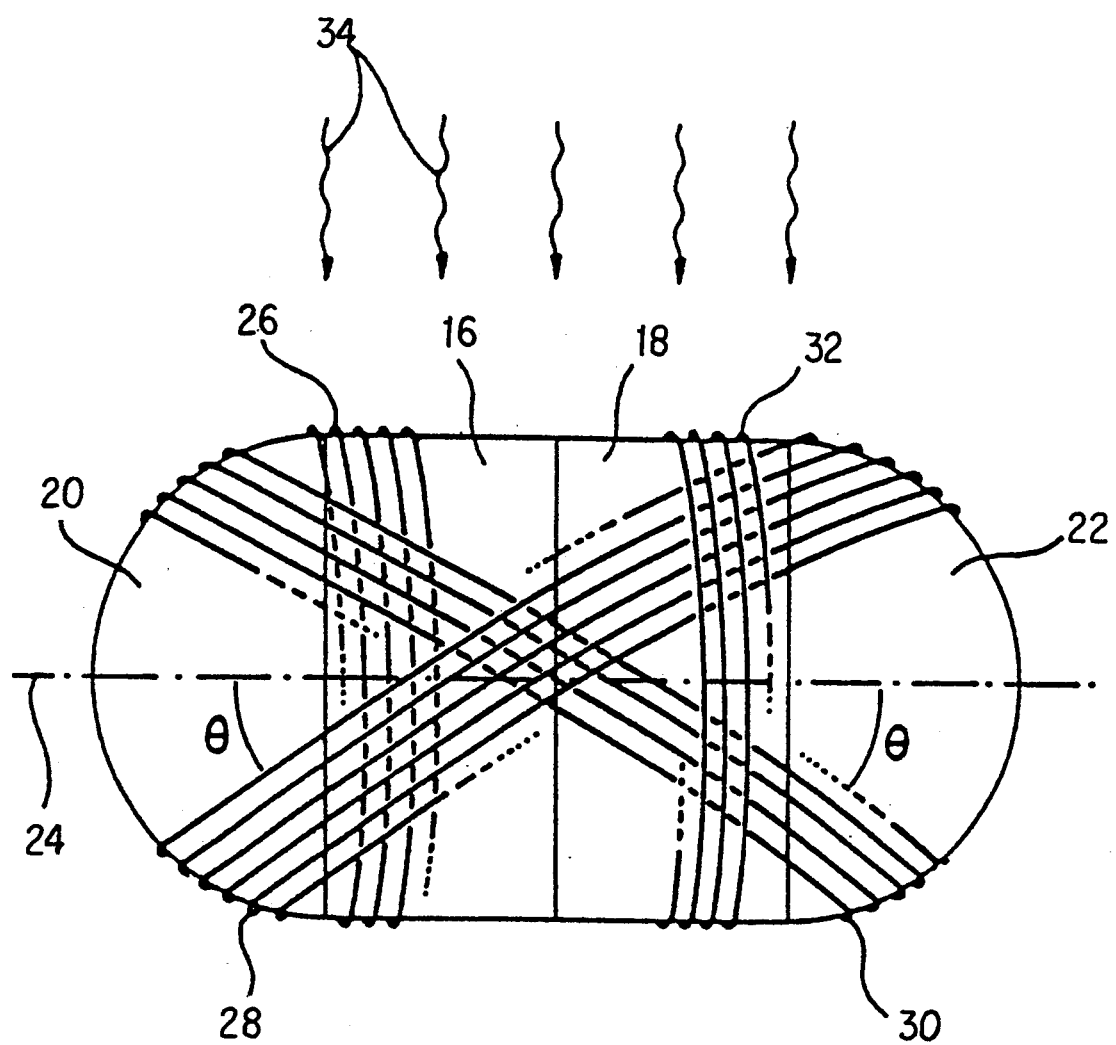

PREPOLYMERS HAVING IMIDE GROUPS

DESCRIPTION

The present invention relates to prepolymers containing imide groups, capable of being employed especially for the production of resins and of composite materials which can be cured under the effect of an ionizing radiation, and to their preparation which calls for the use:
- on the one hand: of reactants generating imide groups, consisting of at least two particular maleimides of different kinds, and
- on the other hand: of two additional reactants, one of which consists of a particular acrylate reactant and the other of a particular vinyl compound other than an acrylate.

More precisely, the subject of the invention is prepolymers containing imide groups, exhibiting a melt viscosity, measured under the conditions defined below, of between 0.1 Pa s and 50 Pa s, characterized in that they comprise the product of reaction in a homogeneous liquid medium, at a temperature ranging from 50° C. to 250° C., between the following reactants (a), (b), (c) and (d):

(a) is an N,N'-bismaleimide of formula:

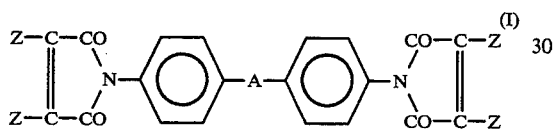

(I)

in which:
each of the symbols Z, which are identical or different, denotes H, CH$_3$ or Cl;
the symbol A denotes a single valency bond or a group:
—CH$_2$—,

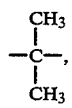

—O—, —S—, —SO$_2$—;

(b) consists of at least one maleimide chosen from the compounds of formula:

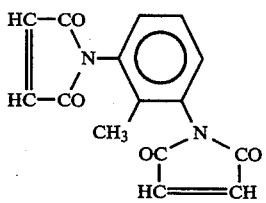

(1)

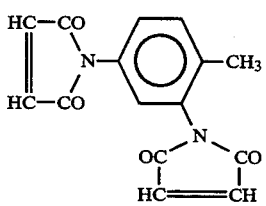

(2)

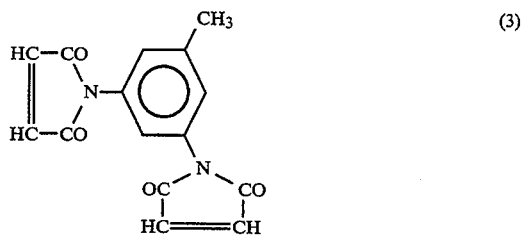

(3)

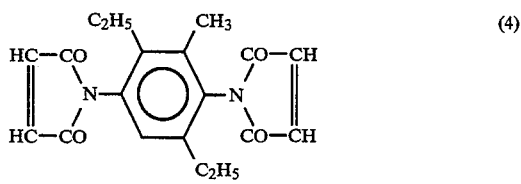

(4)

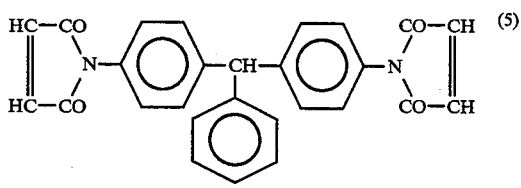

(5)

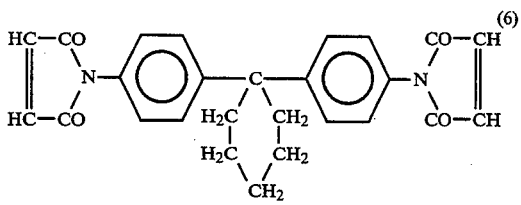

(6)

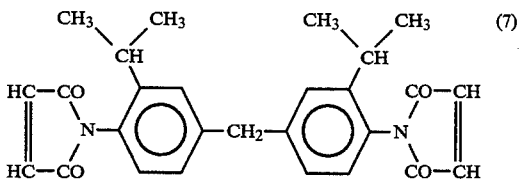

(7)

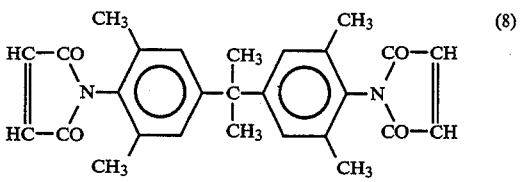

(8)

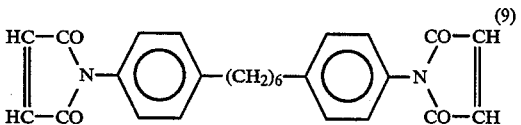

(9)

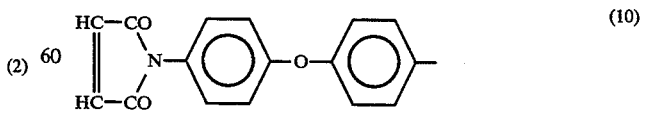

(10)

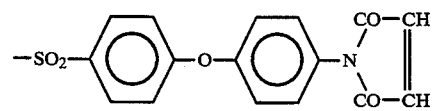

-continued

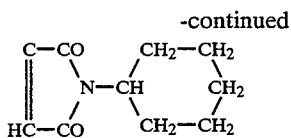
(11)

(c) is an acrylate reactant consisting of one or more compound(s) of general formula:

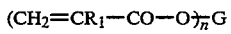
(II)

in which:
the symbol $R_1$ denotes a hydrogen atom or a methyl radical;
n denotes a whole or fractional number equal to at least 1 and not exceeding 8;
the symbol G denotes an organic radical of valency n derived: from a linear or branched, saturated aliphatic residue containing from 1 to 30 carbon atoms and capable of containing one or a number of oxygen bridge(s) and/or one or a number of free hydroxyl functional group(s); from an aromatic residue (of aryl or arylaliphatic type) containing from 6 to 150 carbon atoms, consisting of a benzene nucleus, capable of being substituted by one to three alkyl radicals containing from 1 to 5 carbon atoms or by a number of benzene nuclei, which are optionally substituted as indicated above, which are joined to each other by a single valency bond, an inert group or an alkylene radical containing from 1 to 3 carbon atoms, it being possible for the said aromatic residue to contain in various places of its structure one or a number of oxygen bridge(s) and/or one or a number of free hydroxyl functional group(s), it being possible for the free valency(valencies) of the aromatic radical G to be carried by a carbon atom of an aliphatic chain and/or by a carbon atom of a benzene nucleus;
(d) is a reactant comprising a vinyl double bond and chosen from vinylpyridines, N-vinyl-2-pyrrolidone, vinyltetrahydrofuran, styrene and mixtures thereof.

BRIEF DESCRIPTION OF THE DRAWING

The single drawing FIGURE is a schematic illustration for the manufacture of a composite material with fiber reinforcement.

By way of specific examples of bismaleimides (a) of formula (I) there may be mentioned in particular:
N,N'-(4,4'-diphenylmethane)bismaleimide,
N,N'-(4,4'-diphenyl ether)bismaleimide,
N,N'-[4,4'-(2,2-diphenylpropane)]bismaleimide,
N,N'-(4,4'-diphenyl sulfide)bismaleimide,
N,N'-(4,4'-diphenyl sulfone)bismaleimide.

Among these bismaleimides (a) preference is given to N,N'-(4,4'-diphenylmethane)bismaleimide.

Among the maleimides (b) preference is given to compounds of formulae (I) (or N,N'-(2-methyl-1,3-phenylene)bismaleimide), (2) (or N,N'-(4-methyl-1,3-phenylene)bismaleimide), and (3) (or N,N'-(5-methyl-1,3-phenylene)bismaleimide), and mixtures thereof.

Maleimides (a) and (b) are known products which can be prepared by the processes described especially in U.S. Pat. No. 3,018,290 and British Patent GB-A-1,137,290.

As acrylate reactant (c) which is suitable there may be mentioned:

(c1) the mono(meth)acrylates corresponding to the formula (II) in which:
n=1, and
G denotes a monovalent organic radical of formula:

(III)

in which: $G_1$ denotes a linear or branched alkyl radical containing from 1 to 6 carbon atoms or a phenyl radical; and m is a integer equal to zero, 1, 2, 3, 4 or 5;

(c2) the di(meth)acrylates corresponding to the formula (II) in which:
n=2, and
G denotes a divalent organic radical of formula:

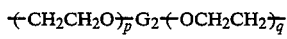
(IV)

in which: $G_2$ denotes a linear or branched alkylene divalent radical containing from 2 to 9 carbon atoms and capable of containing one or a number of oxygen bridge(s) or a radical of formula

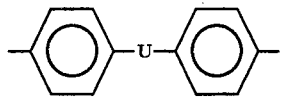

in which the symbol U denotes a single valency bond or a group:

$-CH_2-$, $-CH_2-CH_2$, $-CH(CH_3)CH_2$,

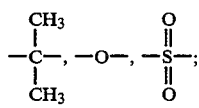

each of the symbols p and q, which are identical or different, denoting an integer equal to zero, 1, 2, 3, 4 or 5;

(c3) the tri- and tetra(meth)acrylates corresponding to the formula (II) in which:
n=3 or 4, and
G denotes a trivalent or tetravalent organic radical derived from a linear or branched saturated aliphatic residue containing from 3 to 20 carbon atoms and capable of containing one or a number of oxygen bridge(s) and/or one or a number of free hydroxyl functional group(s);

(c4) the (meth)acrylates of epoxy novolacs which, while corresponding to the formula (II), are here denoted by the following formula:

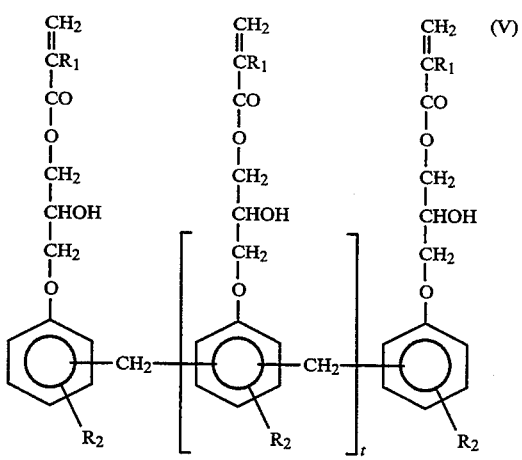

in which:
- the symbol $R_1$ has the meaning given above in connection with formula (II);
- the symbol $R_2$ denotes a hydrogen atom or a methyl radical;
- $t$ is a whole or fractional number lying in the range from 0.1 to 7;
- (c5) mixtures of a number of acrylates and/or methacrylates of one type [(c1), (c2), (c3) or (c4)] with each other or mixtures of one or more acrylate(s) and/or methacrylate(s) of one type with one or more acrylate(s) and/or methacrylate(s) of another type.

By way of specific examples of acrylate reactant (c1) which are suitable, there may be mentioned in particular: methyl mono(meth)acrylates, (monooxyethylated)- phenol mono(meth)acrylates and (dioxyethylated)- phenol mono(meth)acrylates.

By way of specific examples of acrylate reactant (c2) which are suitable, there may be mentioned: ethylene glycol di(meth)acrylates, 1,4-butanediol di(meth)acrylates, 1,6-hexanediol di(meth)acrylates, tripropylene glycol di(meth)acrylates, di(meth)acrylates of the following optionally di(mono- or polyoxyethylated) diphenols: 4,4'-dihydroxydiphenylmethane, bisphenol A, 4,4'-dihydroxydiphenyl ether and in particular di(meth)acrylates of di(monooxyethylated) bisphenol A or di(meth)acrylates of di(dioxyethylated) bisphenol A [cf. formula (IV) in which $G_2$ denotes the radical:

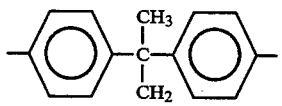

and $p=q=1$ or 2 ].

By way of specific examples of acrylate reactant (c3) which are suitable, there may be mentioned in particular: 1,2,4-butanetriol tri(meth)acrylates, 1,2,6-hexanetriol tri(meth)acrylates, trimethylolpropane tri(meth)acrylates, pentaerythritol tri(meth)acrylates and pentaerythritol tetra(meth)acrylates.

The (meth)acrylates of epoxy novolacs (c4) are known products some of which are available commercially. They can be prepared by reacting (meth)acrylic acids with an epoxy resin of novolac type, the latter being the product of reaction of epichlorohydrin and of phenol/formaldehyde polycondensates [in the formula (V) given above $R_2$ is then a hydrogen atom] or of cresol/formaldehyde polycondensates [$R_2$ is then a methyl radical in the formula]. These oligomeric polyacrylates (c4) and a process for preparing them are to be found described, for example, in U.S. Pat. No. 3,535,403.

By way of specific examples of acrylate reactant (c4) which are suitable, there may be mentioned in particular the acrylates of epoxy novolacs of formula (V) in which $R_1$ and $R_2$ denote a hydrogen atom and $t$ is a whole or fractional number lying in the range from 0.1 to 5.

By way of specific examples of acrylate reactant (c5) which are suitable, there may be mentioned:
- mixtures M1 of a (meth)acrylate of epoxy novolac (c4) with a triacrylate and/or a trimethacrylate corresponding to the definitions given above in connection with the acrylate reactant (c3) and in particular the mixtures M'1 of a suitable acrylate of epoxy novolac chosen from those just mentioned, with a suitable triacrylate and/or trimethacrylate chosen from those just mentioned;
- mixtures M2 of a di(meth)acrylate (c2) of di(monooxyethylated) bisphenol A or of a di(meth)acrylate (c2) of di(dioxyethylated) bisphenol A with a (meth)acrylate of epoxy novolac (c4), and in particular the mixtures M'2 of a di(meth)acrylate (c2) of di(monooxyethylated) bisphenol A or of a di(meth)acrylate (c2) of di(dioxyethylated) bisphenol A with a suitable acrylate of epoxy novolac chosen from those just mentioned;
- the mixtures M3 or M'3 of a di(meth)acrylate (c2) of di(monooxyethylated) bisphenol A or of a di(meth)acrylate (c2) of di(dioxyethylated) bisphenol A with a mixture M1 (overall mixture called M3) or with a mixture M'1 (overall mixture called M'3).

The acrylate reactant (c) which is preferably employed consists of the mixtures:

mixtures M'2:
- of a di(meth)acrylate (c2) of di(monooxyethylated) bisphenol A or of a di(meth)acrylate (c2) of di(dioxyethylated) bisphenol A,
- with an acrylate of epoxy novolac of formula (V) in which $R_1$ and $R_2$ denote a hydrogen atom and $t$ is a whole or fractional number lying in the range from 0.1 to 5;

mixtures M'3:
- of a di(meth)acrylate (c2) of di(monooxyethylated) bisphenol A or of a di(meth)acrylate (c2) of di(dioxyethylated) bisphenol A,
- with a mixture M'1 made up of an acrylate of epoxy novolac of formula (V) in which $R_1$ and $R_2$ denote a hydrogen atom and $t$ is a whole or fractional number lying in the range from 0.1 to 5, with a triacrylate and/or a trimethacrylate chosen from 1,2,4-butanetriol tri(meth)acrylates, 1,2,6-hexanetriol tri(meth)acrylates, trimethylolpropane tri(meth)acrylates and pentaerythritol tri(meth)acrylates.

The acrylate reactant (c) which is very preferably employed consists of the mixtures M"3:
- of a di(meth)acrylate (c2) of di(monooxyethylated) bisphenol A or of a di(meth)acrylate (c2) of di(dioxyethylated) bisphenol A,
- with a mixture M"1 made up of an acrylate of epoxy novolac of formula (V) in which $R_1$ and $R_2$ denote a hydrogen atom and $t$ is a whole or fractional number lying in the range from 0.1 to 5, with trimethylolpropane triacrylate.

In the mixtures M2, M'2, M3, M'3 or M"3 of abovementioned acrylates the proportions of the constituents may vary within wide limits; the proportions of the constituents are preferably chosen so that the ratio:

$$\frac{\text{weight of (meth)acrylate } (c4) \text{ taken by itself or mixed with the (meth)acrylate } (c3)}{\text{weight of di(meth)acrylate } (c2)}$$

varies between 0.2 and 5. Still more preferably, the value of this ratio varies between 1 and 3.

With regard to the proportions of (meth)acrylate (c3) in the mixtures which may contain it (M1, M'1, M"1), these represent not more than 30% by weight and preferably not more than 25% by weight, expressed in relation to the weight of the mixture of (meth)acrylates (c3)+(c4).

Among the compounds which can be employed as reactant (d) comprising a vinyl double bond, preference is given to N-vinyl-2-pyrrolidone.

In the prepolymers containing imide groups which have just been defined, the quantities of maleimide reactants (a) and (b) are chosen so as to have, by weight in relation to the
combination (a)+(b):
from 50 to 90% and, preferably, from 60 to 80% of bismaleimide (a) of formula (I), and
from 50 to 10% and, preferably, from 40 to 20% of maleimide(s) (b) of formulae (1) to (11).

With regard to the additional acrylate reactant (c) made up of one or a number of compound(s) of formula (II), this is employed in a quantity representing from 5 to 50% and, preferably, from 10 to 30% of the weight of the combination of the reactants (a)+(b)+(c)+(d).

With regard to the additional reactant (d), made up of one or a number of compound(s) containing vinyl double bond, this is employed in a quantity representing from 0.1 to 10% and, preferably, from 2 to 8% of the weight of the combination of the reactants (a)+(b)+(c)+(d).

The prepolymers containing imide groups according to the invention can be prepared in the molten state, in bulk, according to the advantageous procedure described below.

First of all an intimate mixture of the bismaleimide (a) with the maleimide(s) (b) is produced by operating with stirring and at a temperature not exceeding the melting temperature of the maleimide which is the most difficult one to liquefy and generally between 50° C. and 250° C. and preferably between 80° C. and 180° C., until a homogeneous liquid mixture is obtained (stage 1).

The reactant (d) is then added to the molten mixture which is stirred and kept at a temperature identical with or different from that used in the preceding stage, also between 50° C. and 250° C. and, preferably, between 80° C. and 180° C., and care is next taken to allow the reaction mixture to react with stirring for a period ranging, for example, from 2 minutes to 15 minutes before going on to the introduction of the acrylate reactant (c) which remains to be used (stage 2).

Finally, the acrylate reactant (c) is added and the reaction mixture is again allowed to react with stirring for a period ranging, for example, from 2 minutes to 15 minutes, and the prepolymer formed is next immediately poured outside the reactor which has been used to prepare it (stage 3).

The melt viscosity of the prepolymers thus obtained can be easily adjusted to the desired value of between 0.1 Pa s and 50 Pa s, especially by modifying the nature and the respective proportions of the reactants used and the temperature and the duration of the various stages of the process of manufacture which has just been discussed.

The operations just described can be performed not only in the melt but also in the presence of variable quantities of a polar liquid such as, for example: cresol, dimethylformamide, N-methylpyrrolidone, dimethylacetamide, methyl ethyl ketone, dioxane or cyclohexanone.

Without wishing to be bound by the explanations which follow, it is thought that the maleimide(s) (b) is(are) used to lower the melting point of the bismaleimide (a) by forming a eutectic; that the reactant (d) is used to promote the reaction between the maleimides (a) and (b) so as to avoid a recrystallization, and that the acrylate (c) is used to lower the viscosity of the prepolymers.

In the homogeneous liquid state the prepolymers according to the invention can be employed directly, for example for impregnating conductors or for making moldings merely by being cast hot. It is also possible, after cooling and grinding, to employ these prepolymers in the form of powders, for example to obtain compression-molded objects, optionally in combination with fibrous or pulverulent fillers. The prepolymers can also be employed in solution for the preparation of coatings, of adhesive bonding, of laminated materials whose backbone may be in the form of woven or nonwoven sheets, of unidirectional elements or of natural or synthetic staple fibers such as, for example, glass, boron, carbon, tungsten, silicon, polyamideimide or aromatic polyamide filaments or fibers.

However, the prepolymers according to the present invention essentially offer a very special advantage for the production of resins capable of being cured under the effect of an ionizing radiation forming part of the manufacture of composite materials with a fiber reinforcement.

These resins which are capable of being cured under ionizing radiation comprise a prepolymer A containing imide groups, as defined above, and at least one reactive diluent B consisting of a vinyl-ended monomer copolymerizable with the said prepolymer A when a mixture of prepolymer A and of the diluent B is subjected to an ionizing radiation, the total quantity of diluent B being such that the maleimide functional groups of the prepolymer A are all consumed after the action of the ionizing radiation.

"Ionizing radiation" is intended to mean an X, gamma, beta, visible or ultraviolet radiation and "curing" is intended to mean a polymerization and/or a crosslinking.

The reactive diluent(s) B make it possible, after irradiation, to obtain degrees of crosslinking of the bismaledimide which are higher than 95%.

In general, each of the reactive diluent(s) B contains(-contain) a main carbon chain of 1 to 20 carbon atoms and preferably of 1 to 10 carbon atoms.

The reactive diluent B employed may be acrylate monomers of the trimethylolpropane triacrylate (TMPTA) type of formula:

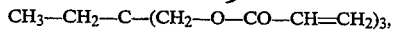

trimethylolpropane trimethacrylate (TMPTM) of formula:

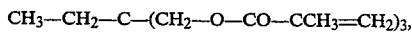

or triallyl cyanurate of formula:

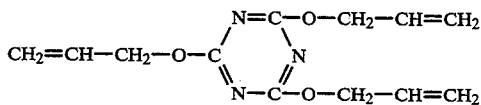

It is also possible to employ styrene and alkylstyrenes in which each of the alkyl radicals contains from 1 to 5 carbon atoms, such as 2-methylstyrene, 3,4-methylstyrene or divinylbenzene (DVB). It is also possible to employ N-vinyl-2-pyrrolidone (NVP), butyl vinyl ether (BVE), vinylanisoles such as 4-vinylanisole, and vinylpyridines such as 4-vinylpyridine, and the like.

These reactive diluents B can be employed by themselves or combined, depending on the required conditions of use and in particular according to the required viscosity.

The reactant (d) and the diluent B may be identical or different.

The choice of the reactive diluent(s) B depends essentially on the envisaged application and on the pot life of the resin, required for its use.

The pot life is the time during which the viscosity required for the use of the resin does not, or virtually does not, move. For example, for the impregnation of a fabric, the viscosity of the resin during the impregnation must remain within the range from 0.5 to 1 Pas.

Depending on the envisaged application, the time during which the viscosity of the resin must remain practically constant is between 1 and 20 hours.

Formulations which are capable of being cured under radiation or electron bombardment based on DVB or styrene are much more reactive than the other formulations, but their life is short and requires rapid use. On the other hand, their glass transition temperature is very high.

NVP offers the best compromise between the requirement of use and the pot life of the resin, on the one hand, and of the glass transition temperature, on the other hand.

A resin which contains only a prepolymer A according to the invention does not exhibit a sufficient thermal property, after irradiation under ionizing radiation, since its glass transition temperature is lower than 100° C. When this prepolymer A is mixed with one or a number of reactive diluents B, the glass transition temperatures of these same resins can develop from 250° to 360° C., after irradiation.

The optimized quantity of reactive diluent B is determined by physicochemical analysis and is obtained when, after irradiation, the maleimide functional groups of the prepolymer are completely consumed and when there is no excess vinyl functional group. Also, to obtain a high degree of crosslinking of the prepolymer, the quantity of diluent is chosen within the range of 10 to 50 parts by weight and advantageously within the range of 20 to 40 parts by weight and, better still, of 30 to 40 parts by weight, per 100 parts by weight of prepolymer A.

The curing of the resins under ionizing radiation is obtained by mixing the prepolymer A (a+b+c+d) and the reactive diluent B before use or application of the resins and by then subjecting the mixture obtained to an ionizing radiation.

These resins are intended for the manufacture of composite materials, especially with a fiber reinforcement, by various known processes such as casting, filament reeling, one- or multidirectional lay-up, preimpregnation, injection and the like.

A composite material with fiber reinforcement is obtained by impregnating the fiber reinforcement with a resin which is described above and by then subjecting the whole to an ionizing radiation.

The fiber reinforcement may consist of woven, braided or reeled yarns such as referred to above.

The action of an ionizing radiation on a resin by itself permits a conversion of at least 98% of the maleimide functional groups of the prepolymer A.

On the other hand, the degree of conversion of these functional groups is of the order of 84 to 88% in the case of a composite material. Also, to obtain an optimization of the mechanical properties, a postcure of the material at a temperature of, for example, 180° C. to 300° C., at atmospheric pressure, for 30 minutes to 8 hours, can be envisaged. In practice the postcure is performed at a temperature of 180° C. to 250° C. for 2 to 8 hours.

The resin irradiation doses are high and lie in the range of 100 to 350 kGy and preferably from 250 to 350 kGy.

These irradiation doses are obtained by passing each prepolymer-diluent mixture at a certain speed under a particle accelerator. This speed is a function of the dose and of the characteristics of the accelerator; that is $D = K/V$ where D is the irradiation dose expressed in KGy, K is a factor depending on the characteristics (energy and power) and the settings of the accelerator (scanning frequency, scanning width, pulse frequency) and V represents the speed of travel of the mixture.

In the case of a 10 MeV electron accelerator with a power of 10 kW, the relation obtained is 10 kGy=2 m/min.

Given that doses as large as this would occur at overly slow speeds (6 to 7 cm/min), a speed which is frequently difficult to obtain with an industrial means, use is advantageously made of a dose distribution by successively passing the mixture under the accelerator. The best compromise is obtained by a single pass of 50 kGy, which corresponds to a speed of 40 cm/min.

Other characteristics and advantages of the invention will emerge better from the description which is to follow, given by way of illustration and without any limitation being implied, with reference to the single figure illustrating the manufacture of a composite material by filament reeling.

The example which follows illustrates how the invention can be put into practice.

EXAMPLE

Stage 1: a mixture of:
162.33 g of N,N'-(4,4'-diphenylmethane)bismaleimide, and
69.56 g of N,N'-(4-methyl-1,3-phenylene)bismaleimide
is introduced over 12 minutes and with stirring into a 350-cm³ glass reactor fitted with a stainless steel anchor-type stirrer and preheated by introducing the said reactor into an oil bath heated to 165° C.

The mixture is stirred continually until the ingredients introduced melt completely and a homogeneous liquid mass is obtained; the length of this additional stirring is 5 minutes.

Stage 2:17.82 g of N-vinyl-2-pyrrolidone are next introduced into the homogeneous liquid mass and the whole is then allowed to react with stirring for 5 minutes.

Stage 3: The reactor is taken out of the heated oil bath and a mixture of the following is then added to the reaction mass while continuing to stir:

26.76 g of diacrylate of di(dioxyethylated) bisphenol A, this compound being that available commercially under the registered trademark Ebecryl 150 from UCB, and 53.53 g of acrylate compound consisting of the mixture based on 80% by weight of a diacrylate of epoxy novolac of formula (V), in which $R_1=R_2=H$ and t is a number equal to approximately 3, and on 20% by weight of trimethylolpropane triacrylate, this compound being that available commercially under the registered trademark Ebecryl 629 from UCB.

After introduction of the acrylate compounds the whole is allowed to react with stirring for 3 minutes and the reaction mass obtained is then poured into a metal container. After cooling to room temperature the desired prepolymer is obtained in solid state. Its viscosity at 80° C. is 5.5 Pa s; this viscosity rises to 6.9 Pa s after the prepolymer has been kept at 80° C. for one hour.

The melt viscosity referred to in the present specification is the dynamic viscosity of the prepolymer obtained at the time of the pouring at the end of the process of preparation conducted in bulk; it is measured at 80° C.±0.1° C. with a Contraves Rheomat 30 viscometer fitted with a spindle rotating under a gradient of 13 $s^{-1}$; its value is given in Pa s.

The prepolymer obtained is then ready for use for the manufacture of a composite material with fiber reinforcement. The manufacture of two rocket engine interstage shells by filament reeling is described below, by way of illustration.

Just before the reeling, approximately 100 parts by weight of prepolymer A are melted with stirring at 80° C. and 40 parts by weight of N-vinyl-2-pyrrolidone are heated to 40° C. as reactive diluent B. The reactive diluent B is added to the molten prepolymer with slow stirring and the whole is then cooled to a use temperature of 35° C. A carbon roving of 3,000 to 12,000 filaments is then impregnated with the resin obtained. The impregnation is done by passing the roving continuously, using a roll, through the resin bath, at a speed which can vary as a function of the trajectory of deposition, in a known manner.

This roving is reeled onto the single-block structure shown in the FIGURE, consisting of two homothetical shells 16 and 18 sandwiched between two identical hemispherical satellites 20 and 22. The combined structure has an axis of revolution 24.

The two shells are intended to work essentially in compression and are therefore manufactured by four successive windings: an internal winding 26 along the circumference of the shells, two lengthwise windings 28 and 30, each forming an angle $\theta$ of 30° relative to the axis 24 and, finally, an outer winding 32 along the circumference.

The temperature of impregnation of the carbon roving is 35° C. and the resin viscosity is 0.5×10 Pa s. The pot life of the resin is longer than 12 h. The degree of impregnation is 30% by weight.

The reeling is carried out with the same ease as in the case of a carbon yarn impregnated with an acrylic-ended epoxy resin.

The curing of the composite material is done at 300 kGy by a pass of 50 kGy at a speed of 20 cm/min in rotation according to the axis 24, the total irradiation time is 2 h.

After polymerization under electron bombardment the structure is sectioned to recover the two shells 16 and 18.

Postcuring of the shells is then performed at 180° C. for 8 h. The dimensional stability, before and after postcuring, is good.

We claim:

1. Prepolymers containing imide groups, capable of being employed especially for the production of resins which can be cured under the effect of an ionizing radiation and exhibiting a melt viscosity of between 0.1 Pa s and 50 Pa s, characterized in that they comprise the product of reaction in a homogeneous liquid medium, at a temperature ranging from 50° C. to 250° C., between the following reactants (a), (b), (c) and (d):

(a) is an N,N'-bismaleimide of formula:

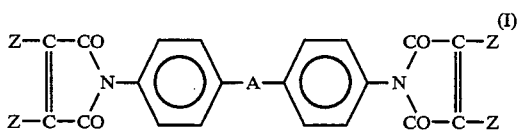

in which:
each of the symbols Z, which are identical or different, denotes H, $CH_3$ or Cl;
the symbol A denotes a single valency bond or a group:

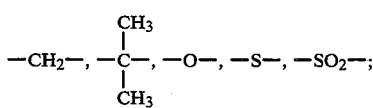

(b) consists of at least one maleimide chosen from the compounds of formula:

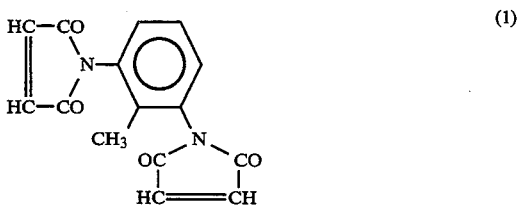

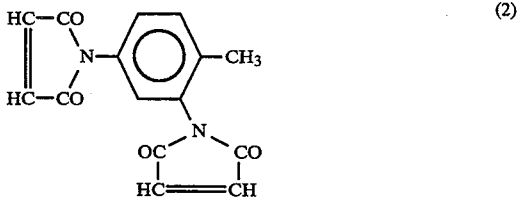

-continued (3) [Structure: HC=CO and HC=COH attached to N on a tolyl group (CH3-phenyl) with another N-maleimide substituent (OC-CH=CH-CO-N)]

(4) [Structure: bis-maleimide on a benzene ring substituted with C2H5, CH3, and C2H5]

(5) [Structure: bis-maleimide linked via CH(phenyl) between two phenyl rings]

(6) [Structure: bis-maleimide linked via C(cyclopentyl-like, H2C-CH2/H2C-CH2/CH2) between two phenyl rings]

(7) [Structure: bis-maleimide with two isopropyl (CH(CH3)2) substituted phenyl rings joined by CH2]

(8) [Structure: bis-maleimide with tetramethyl-substituted phenyl rings joined by C(CH3)2]

(9) [Structure: bis-maleimide with two phenyl rings joined by (CH2)6]

(10) [Structure: maleimide–phenyl–O–phenyl–SO2–phenyl–O–phenyl–maleimide]

-continued

(11) [Structure: maleimide N-substituted with CH bearing (CH2-CH2)2CH2 cyclohexyl-like ring]

(c) is an acrylate reactant consisting of one or more compound(s) of general formula:

$$(CH_2=CR_1-CO-O)_{\overline{n}}G \qquad (II)$$

in which:
- the symbol $R_1$ denotes a hydrogen atom or a methyl radical;
- n denotes a whole or fractional number equal to at least 1 and not exceeding 8;
- the symbol G denotes an organic radical of valency n derived: from a linear or branched, saturated aliphatic residue containing from 1 to 30 carbon atoms and capable of containing one or a number of oxygen bridge(s) and/or one or a number of free hydroxyl functional group(s); from an aromatic residue (of aryl or arylaliphatic type) containing from 6 to 150 carbon atoms, consisting of a benzene nucleus, capable of being substituted by one to three alkyl radicals containing from 1 to 5 carbon atoms or by a number of benzene nuclei, which are optionally substituted as indicated above, which are joined to each other by a single valency bond, an inert group or an alkylene radical containing from 1 to 3 carbon atoms, it being possible for the said aromatic residue to contain in various places of its structure one or a number of oxygen bridge(s) and/or one or a number of free hydroxyl functional group(s), it being possible for the free valency(valencies) of the aromatic radical G to be carried by a carbon atom of an aliphatic chain and/or by a carbon atom of a benzene nucleus;

(d) is a reactant comprising a vinyl double bond and chosen from vinylpyridines, N-vinyl-2-pyrrolidone, vinyltetrahydrofuran, styrene and mixtures thereof.

2. Prepolymers according to claim 1, characterized in that the reactant (a) is taken from the group made up of:
N,N'-(4,4'-diphenylmethane)bismaleimide,
N,N'-(4,4'-diphenyl ether)bismaleimide,
N,N'-[4,4'-(2,2-diphenylpropane)]bismaleimide,
N,N'-(4,4'-diphenyl sulfide)bismaleimide,
N,N'-(4,4'-diphenyl sulfone)bismaleimide.

3. Prepolymers according to claim 1, characterized in that the reactant (b) is taken from the group made of the compounds of formulae (1) (or N,N'-(2-methyl-1,3-phenylene)bismaleimide), (2) (or N,N'-(4-methyl-1,3-phenylene)bismaleimide), and (3) (or N,N'-(5-methyl-1,3-phenylene)bismaleimide), and mixtures thereof.

4. Prepolymers according to claim 1, characterized in that the acrylate reactant (c) consists of one or a number of compound(s) belonging to the following types (c1), (c2), (c3), (c4) and (c5):

(c1) the mono(meth)acrylates corresponding to the formula (II) in which:
n=1, and
G denotes a monovalent organic radical of formula:

  (III)

in which: $G_1$ denotes a linear or branched alkyl radical containing from 1 to 6 carbon atoms or a phenyl radical; and m is a integer equal to zero, 1, 2, 3, 4 or 5;

(c2) the di(meth)acrylates corresponding to the formula (II) in which:
n=2, and
G denotes a divalent organic radical of formula:

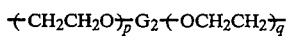  (IV)

in which: $G_2$ denotes a linear or branched alkylene divalent radical containing from 2 to 9 carbon atoms and capable of containing one or a number of oxygen bridge(s) or a radical of formula

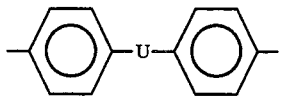

in which the symbol U denotes a single valency bond or a group:
—$CH_2$—, —$CH_2$—$CH_2$, —$CH(CH_3)CH_2$,

each of the symbols p and q, which are identical or different, denoting an integer equal to zero, 1, 2, 3, 4 or 5;

(c3) the tri- and tetra(meth)acrylates corresponding to the formula (II) in which:
n=3 or 4, and
G denotes a trivalent or tetravalent organic radical derived from a linear or branched saturated aliphatic residue containing from 3 to 20 carbon atoms and capable of containing one or a number of oxygen bridge(s) and/or one or a number of free hydroxyl functional group(s);

(c4) the (meth)acrylates of epoxy novolacs which, while corresponding to the formula (II), are here denoted by the following formula:

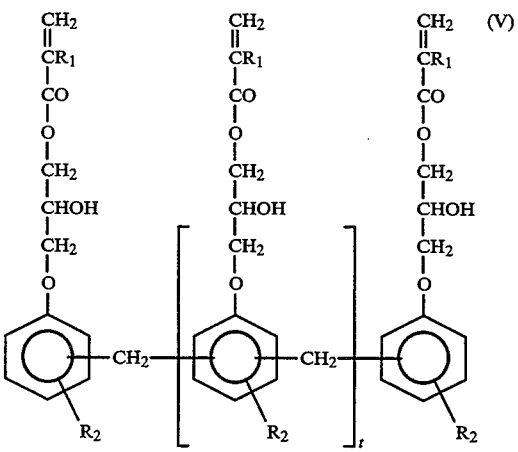  (V)

in which:
the symbol $R_1$ has the meaning given above in connection with formula (II);
the symbol $R_2$ denotes a hydrogen atom or a methyl radical;
t is a whole or fractional number lying in the range from 0.1 to 7;

(c5) mixtures of a number of acrylates and/or methacrylates of one type [(c1), (c2), (c3) or (c4)] with each other or mixtures of one or more acrylate(s) and/or methacrylate(s) of one type with one or more acrylate(s) and/or methacrylate(s) of another type.

5. Prepolymers according to claim 4, characterized in that the acrylate reactant (c) consists of the mixtures:
mixtures M'2:
of a di(meth)acrylate (c2) of di(monooxyethylated) bisphenol A or of a di(meth)acrylate (c2) of di(dioxyethylated) bisphenol A,
with an acrylate of epoxy novolac of formula (V) in which $R_1$ and $R_2$ denote a hydrogen atom and t is a whole or fractional number lying in the range from 0.1 to 5;
mixtures M'3:
of a di(meth)acrylate (c2) of di(monooxyethylated) bisphenol A or of a di(meth)acrylate (C2) of di(dioxyethylated) bisphenol A,
with a mixture M'1 made up of an acrylate of epoxy novolac of formula (V) in which $R_1$ 0and $R_2$ denote a hydrogen atom and t is a whole or fractional number lying in the range from 0.1 to 5, with a triacrylate and/or a trimethacrylate chosen from 1,2,4-butanetriol tri(meth)acrylates, 1,2,6-hexanetriol tri(meth)acrylates, trimethylolpropane tri(meth)acrylates and pentaerythritol tri(meth)acrylates.

6. Prepolymers according to claim 1, characterized in that the quantities of maleimide reactants (a) and (b) are chosen so as to have, by weight in relation to the combination of (a)+(b):
from 50 to 90% of bismaleimide (a) of formula (I), and
from 50 to 10% of maleimide(s) (b) of formulae (1) to (11).

7. Prepolymers according to of claim 1, characterized in that the acrylate reactant (c), made up of one or a number of compound(s) of formula (II) is employed in a quantity representing from 5 to 50% of the weight of the combination of the reactants (a) (b)+(c)+(d).

8. Prepolymers according to claim 1, characterized in that the reactant (d), made up of one or a number of compound(s) containing a vinyl double bond is employed in a quantity representing from 0.1 to 10% by weight of the combination of the reactants (a)+(b)+(c)+(d).

9. Process for the preparation of the prepolymers according to claim 1, characterized in that the following stages are linked in a sequence:
stage 1: the mixture (a)+(b) is melted, the operation being carded out with stirring and at a temperature of between 50° C. and 250° C. until a homogeneous liquid mixture is obtained;
then, stage 2: the reactant (d) is added to the molten mixture which is stirred and kept at a temperature identical with or different from that used in the preceding stage, which is also between 50° C. and 250° C., and care is next taken to allow the reaction mixture to react with stirring for a period ranging from 2 minutes to 15 minutes before starting to introduce the acrylate reactant (c) remaining to be used (stage 2);

and finally, stage 3: the acrylate reactant (c) is added and the reaction mixture is again allowed to react with stirring for a period ranging from 2 minutes to 15 minutes and the prepolymer formed is next immediately poured outside the reactor which has been used to prepare it.

* * * * *